United States Patent [19]

Nakayama et al.

[11] Patent Number: 4,840,988

[45] Date of Patent: Jun. 20, 1989

[54] RUBBER COMPOSITION FOR TIRE TREAD

[75] Inventors: Rinichi Nakayama, Osaka; Yasunori Yoshida, Hyogo; Satoshi Iwama, Osaka, all of Japan

[73] Assignee: Toyo Tire & Rubber Co., Ltd., Osaka, Japan

[21] Appl. No.: 157,036

[22] Filed: Feb. 16, 1988

[30] Foreign Application Priority Data

Feb. 17, 1987 [JP] Japan .................................. 62-35304

[51] Int. Cl.$^4$ .......................... C08K 3/04; C08K 5/01; C08L 9/00
[52] U.S. Cl. ................................... 524/476; 524/474; 524/481; 524/483; 524/484; 524/490; 524/491; 524/571
[58] Field of Search ............... 524/474, 476, 481, 483, 524/484, 490, 491, 571

[56] References Cited

FOREIGN PATENT DOCUMENTS 2415066 10/1974 Fed. Rep. of Germany ...... 524/483
49-21095 5/1974 Japan ................................... 524/483

*Primary Examiner*—Allan M. Lieberman
*Attorney, Agent, or Firm*—Koda and Androlia

[57] ABSTRACT

This invention is a rubber composition for a tire tread of 100 parts by weight (pbw) diene system rubber to which are added x pbw of carbon black and y pbw of softening agent. The softening agent contains z pbw of liquid polymer. The amounts of x, y and z are described by the inequalities $(\frac{3}{5})x - 20 \leq y \leq x$ and $(y/5) + 5 \leq z$. The liquid polymer has a flow points of 20° C. or below. The rubber composition provided here gives a tire tread with improved performance in terms of grade climbing ability, braking and standing start, on ice as well as on snow. Besides, the service life of the rubber is prolonged, and tread performance deterioration is reduced to a minimum.

7 Claims, No Drawings

RUBBER COMPOSITION FOR TIRE TREAD

BACKGROUND OF THE INVENTION

1. Field of the Invention

The present invention relates to rubber compositions for tire treads, which are suitable not only for use on ordinary paved roads, but also particularly suitable for use on icy and snow-covered roads.

2. Description of the Prior Art

Conventionally, for safe travel on icy and snow-covered roads, spike tires have been used in many cases. However, spike tires generate dust as well as noise pollution. In view of these environmental problems, the use of spike tires has become questionable.

Consequently, in recent years, a tire without spike pins, the so-called studless tire, was introduced. However, at its present state of development, this studless tire is inferior to the spike tire in three areas: grade climbing ability, braking performance, and standing start performance. Also, the studless tire usually uses a large amount of softening agent or plasticizer because of the necessity to lower the hardness of the tread portion. In most cases this softening agent or plasticizer migrates into other portions of the tire, such as the belt and side wall portion, which are located contiguous to the tread rubber, or it is lost from the tread rubber by vaporization, etc., thereby causing degradation of the original performance of the tread rubbers.

SUMMARY OF THE INVENTION

Therefore, an object of the present invention is to provide rubber compositions for the tire tread which improve the grade climbing ability and braking performance, as well as the standing start performance of the tire tread when used on ice and snow.

Another object of the present invention is to provide rubber compositions for the tire tread which are capable of extending the life of the tire beyond tread rubber and reducing degradation of the tread rubber performance as much as possible those of the conventional studless tire.

In order to accomplish the objects mentioned above, the present invention employs a compositional structure that contains liquid polymers or a mixture of liquid polymers and other softening agents. Further, specific liquid polymers which have a flow point at or below 20° C. are used. Furthermore, the relationships between the contents of the constituents carbon black (x parts by weight), softening agent inclusive of liquid polymer (y parts by weight) and liquid polymer in the softening agent (z parts by weight) are $(5/8)x - 20 \leq y \leq x$ and $(y/5) + 5 \leq z$.

When the content y of the softening agent inclusive of the liquid polymer lies outside the range designated above relative to the carbon black content x, the performances which are required of the tire tread are unsatisfactory, and the processability suffers because of excessive stickiness. Carbon black content x is preferably in the range from 40 to 130 parts by weight. The liquid polymer is used alone or in combination with high aromatic, naphthene oil, plasticizer, etc. within the range designated above. When the liquid polymer content z lies outside the designated range, the hardness tends to be lower and even if the hardness can be maintained, an excessive increase in hardness after tire service cannot be prevented.

When the softening point of the liquid polymer exceeds 20° C., it cannot serve as a softening agent, and processability suffers. Consequently, it is preferable to select a liquid polymer with a flow point of 20° C. or less.

Desirable liquid polymers are liquid polybutadiene, liquid polybutene, liquid polyisoprene, liquid chloroprene, liquid polyisobutylene, liquid polystyrene butadiene, liquid polysopreneisobutylene, etc.

Therefore, through the use of a liquid polymer within a specified content range, the hardness can be lowered, and the area that contacts the road surface can be increased, thereby improving the grade climbing ability, braking and standing start performances. Furthermore, the liquid polymer possesses a relatively high molecular weight and a very low flow rate in comparison with oil, etc. so that migration into the other portions of the tire as well as vaporization, can be prevented or kept to a minimum. As a result, the life of a studless tire can be prolonged.

DETAILED DESCRIPTION OF THE INVENTION

The Table shows examples of the rubber compositions used in the present invention as well as examples for comparison. In addition to the constituents shown in the Table, 3 parts of zinc white, 2 parts of stearic acid, 1 part of Santoflex 13 (paraphenylenediamine system age resistor (antioxidant)), 1.5 parts of Nocceler MSA-G (sulfenamide system vulcanization accelerator), and 2 parts of sulfur are present in all the embodiments and examples for comparison. All of the constituents were mixed using a Banbury mixer to form a homogeneous mixture and the liquid polymer used was liquid polybutadiene.

Next, the rubber characteristics were determined, both for the compositions of the embodiments of this invention and of the examples for comparison. The results are also shown in the Table.

|  | Embodiment | | | | | Example for Comparison | | | | | | | | | | | | | |
| --- | --- | --- | --- | --- | --- | --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 | 9 | 10 | 11 | 12 | 13 | 14 |
| Natural Rubber | 70 | 70 | 70 | 70 | 70 | 70 | 70 | 70 | 70 | 70 | 70 | 70 | 70 | 70 | 70 | 70 | 70 | 70 | 70 |
| Cis 1.4 BR | 30 | 30 | 30 | 30 | 30 | 30 | 30 | 30 | 30 | 30 | 30 | 30 | 30 | 30 | 30 | 30 | 30 | 30 | 30 |
| Carbon (X) *1 | 80 | 60 | 80 | 80 | 80 | 80 | 80 | 80 | 80 | 80 | 80 | 80 | 80 | 80 | 60 | 60 | 80 | 80 | 80 |
| Aromatic Oil |  |  |  |  |  |  |  |  |  |  |  |  |  |  |  |  |  |  | 60 |
| Naphthene Oil | 20 | 15 | 20 |  |  | 45 | 65 | 25 | 10 | 25 | 60 | 65 | 60 |  | 10 | 10 | 60 |  |  |
| L-BR A *2 | 30 | 15 |  |  |  |  | 15 |  | 5 |  |  | 30 | 20 |  | 10 |  |  |  |  |
| L-BR B *3 |  |  |  |  | 30 |  |  |  |  |  |  |  |  |  |  |  | 5 |  |  |
| L-BR C *4 |  |  |  | 45 | 80 |  |  |  |  |  |  |  |  |  |  |  |  |  |  |

-continued

|  | Embodiment | | | | | Example for Comparison | | | | | | | | | | | | | |
|---|---|---|---|---|---|---|---|---|---|---|---|---|---|---|---|---|---|---|---|
|  | 1 | 2 | 3 | 4 | 5 | 1 | 2 | 3 | 4 | 5 | 6 | 7 | 8 | 9 | 10 | 11 | 12 | 13 | 14 |
| L-BR D *5 |  |  |  |  |  | 80 |  | 15 |  | 25 | 10 |  |  | 30 |  |  | 15 |  |  |
| Total Amount of Softening Agent *6 | 50 | 30 | 65 | 80 | 30 | 80 | 60 | 80 | 30 | 35 | 35 | 90 | 85 | 90 | 10 | 15 | 25 | 60 | 60 |
| (5/8)X-20 | 30 | 17.5 | 30 | 30 | 30 | 30 | 30 | 30 | 30 | 30 | 30 | 30 | 30 | 30 | 17.5 | 17.5 | 30 | 30 | 30 |
| (Y/5)+5 | 15 | 11 | 18 | 21 | 11 | 21 | 17 | 21 | 11 | 12 | 12 | 23 | 22 | 23 | 7 | 8 | 10 |  |  |
| LBR Pour Point *7 | −45 | −45 | 15 | 15 | −55 | 25 | −45 | 25 | −45 | 25 | 25 | −45 | −45 | 25 | −45 | −55 | 25 |  |  |
| Hardness *8 |  |  |  |  |  |  |  |  |  |  |  |  |  |  |  |  |  |  |  |
| (Initial Period) | 51 | 52 | 52 | 50 | 56 | 52 | 47 | 40 | 62 | 66 | 64 | 32 | 35 | 39 | 62 | 60 | 67 | 48 | 52 |
| (After Aging) *9 | 54 | 54 | 54 | 53 | 58 | 54 | 53 | 49 | 65 | 68 | 67 | 40 | 44 | 47 | 64 | 63 | 70 | 56 | 57 |
| Hardness Change *10 | 3 | 2 | 2 | 3 | 2 | 2 | 6 | 9 | 3 | 2 | 3 | 8 | 9 | 8 | 2 | 3 | 3 | 8 | 5 |
| Pico-Abrasion Index *11 | 101 | 108 | 104 | 100 | 135 | 108 | 94 | 66 | 138 | 151 | 143 | 54 | 50 | 70 | 142 | 135 | 160 | 86 | 100 |
| On-Ice Abrasion Index *12 |  |  |  |  |  |  |  |  |  |  |  |  |  |  |  |  |  |  |  |
| (Initial Period) | 112 | 110 | 108 | 109 | 105 | 95 | 115 | 118 | 88 | 80 | 84 | 129 | 123 | 116 | 90 | 92 | 77 | 113 | 100 |
| (After Aging) | 107 | 107 | 105 | 104 | 102 | 92 | 100 | 98 | 83 | 77 | 79 | 109 | 100 | 96 | 87 | 87 | 73 | 93 | 92 |
| Rolling Processability *13 | O | O | O | Δ | O | X | O | X | X | X | Δ | X | X | X | Δ | Δ | X | O | Δ |

Notes:
*1 Carbon black (ISAF)
*2 Liquid polybutadiene flow point −45° C.
*3 Liquid polybutadiene flow point −55° C.
*4 Liquid polybutadiene flow point 15° C.
*5 Liquid polybutadiene flow point 25° C.
*6 Total amount of softening agent (y) = Amount of liquid polybutadiene (x) + Amount of other softening agents
*7 The flow point was measured using the method in accordance with JIS K2269.
*8 The hardness was measured in accordance with JIS K6301.
*9 The hardness at 25° C., after heat aging at 50° C., for two months.
*10 The change of hardness shows the difference in hardness obtained by subtracting the initial hardness from the hardness after aging.
*11 The pico-abrasion index evaluation was carried out using a pico-abrasion tester. The index is assigned a value of 100 for comparison example 14. The abrasion resistance becomes higher as the numerical value of the index increases.
*12 The on-ice friction index evaluation was carried out using a portable skid resistance tester, by covering the road surface with ice, and using test pieces in the initial period and after aging. The index is assigned a value of 100 for the comparison example 14. A higher numerical value indicates higher on-ice friction. The aging conditions employed were heated to 50° C. over a two month duration.
*13 With respect to the roll processabilty, the rolling workabilty was evaluated by assigning 3 grades for the respective rubber compositions after mixing: O denotes "good", Δ denotes "acceptable (fairly good)", and X denotes "reject".

It is apparent from the Table, in comparison examples 13 and 14 which use conventional softening agents, such as aromatic oil and do not contain liquid polymers, that the change in hardness due to the aging is great, and also that the variation in the on-ice friction index is significant. Therefore, these compositions are not desirable. Comparison examples 1 through 14 show that even if a softening agent containing a liquid polymer is used, the liquid polymer must meet the compositional relationships represented by the specific inequalities mentioned previously, and must have a flow point of 20° C. or below. Otherwise, the balanced characteristics in terms of satisfactory hardness, pico-abrasion index, on-ice friction index, and rolling processability cannot be obtained.

For example, in comparison examples 1 and 5 which use softening agents containing the specified liquid polymers in amounts which satisfy the prescribed inequalities, the hardness and the change of hardness before and after aging are satisfactory, but the on-ice friction coefficient is rather lower than comparison examples 13 and 14, as it is the rolling processability, because liquid polymers having flow points of 20° C. or above are used. Also, in comparison example 2 in which the liquid polymer content in the softening agent is less than the specified amount, the change in hardness before and after aging is great, and a tendency for the hardness to increase after heat aging is observed. Consequently, the change of the on-ice friction index is great, and its decrease is significant.

On the other hand, in comparison example 3 the specified inequalities are satisfied only in terms of the relationship between the amount of carbon black and the total amount of the softening agent, the variation in hardness is very great, and also the pico-abrasion index is extremely low. Besides, reduction in the on-ice friction index is conspicuous, and the roll processability is inferior.

In comparison example 7, the liquid polymer has the required flow point, but is present in the softening agent in an amount close to the lower limit of the specified range and the total amount of softening agent is larger than the amount of carbon black. As a result, while the on-ice friction index initially is high, it decreases greatly during aging. In addition, the change in hardness is marked, the pico-abrasion index is low, and the roll processability is inferior.

Unlike those comparison examples mentioned above, embodiments 1 through 4 contain carbon black (x parts by weight), softening agent (y parts by weight) and liquid polymer in the softening agent (z parts by weight)

according to the relationships of $(5/8)x-20 \leq y \leq x$ and $(y/5)+5 \leq z$ relative to 100 parts by weight of diene system rubber, and use liquid polymers with flow points of 20° C. or below. For these compositions the hardness as well as its variations; the pico-abrasion index; the on-ice friction index as well as its variation; and the roll processabiliity are all satisfactory. This indicates that they are rubber compositions with specifically well-balanced characteristics.

As described above, this invention comprises a liquid polymer having a flow point below a specified temperature present in the softening agent above a specified amount and also limited in amount within a specified range relative to the amount of carbon black. As a result, all the performance parameters including grade climbing ability on ice and snow, braking performance and standing start performance are improved. Furthermore, the compositions specified in this invention extend the life of the rubber.

We claim:

1. A rubber composition for a tire tread for icy and snow covered roads comprising:
   diene system rubber in the amount of 100 parts by weight (pbw);
   carbon black in the amount of x pbw; and
   a softening agent in the amount of y pbw, with the relationship between x and y given by the inequality $(5/8)x-20 \leq y \leq x$, said softening agent being selected from the group consisting of z parts by weight of liquid polymer alone and z parts by weight of liquid polymer in combination with naphthene oil, said z parts by weight being selected in compliance with the inequality $(y/5)+5 \leq z$ with a flow point of said liquid polymer being 20° C. or below and said liquid polymer being selected from the group consisting of one or more of liquid polybutadiene, liquid polybutene, liquid polyisoprene, liquid polyisobutylene and liquid polyisopreneisobutylene.

2. The composition of claim 1 wherein:
   the carbon black content is 80 pbw; and
   the softening agent comprises 20 pbw naphthene oil and 30 pbw liquid polybutadiene with flow point −45° C.

3. The composition of claim 1 wherein:
   the carbon black content is 60 pbw; and
   the softening agent comprises 15 pbw naphthene oil and 15 pbw liquid polybutadiene with flow point −45° C.

4. The composition of claim 1 wherein:
   the carbon black content is 80 pbw; and
   the softening agent comprises 20 pbw naphthene oil and 45 pbw liquid polybutadiene with flow point 15° C.

5. The composition of claim 1 wherein:
   the carbon black content is 80 pbw; and
   the softening agent is 80 pbw liquid polybutadiene with flow point 15° C.

6. The composition of claim 1 wherein:
   the carbon black content is 80 pbw; and
   the softening agent is 30 pbw liquid polybutadiene with flow point −55° C.

7. A rubber composition for a tire tread for icy and snow covered roads comprising:
   diene system rubber in the amount of 100 parts by weight (pbw);
   carbon black in the amount of x parts by weight; and
   a softening agent in the amount of y parts by weight, with the relationship between x and y parts given by the inequality $(5/8)x-20 \leq y \leq x$, said softening agent being selected from the group consisting of z parts by weight of liquid polymer alone and z parts by weight of liquid polymer in combination with one or more hydrocarbon oils selected from the group consisting of aromatic oils and naphthene oils, said z parts by weight being determined in compliance with the inequality $(y/5)+5 \leq z$ with a flow point of said liquid polymer being 20° C. or below and said liquid polymer being selected from the group consisting of one or more of liquid polybutadiene, liquid polybutene, liquid polyisoprene, liquid chloroprene, liquid polyisobutylene, liquid polystyrenebutadiene and liquid polyisopreneisobutylene.

* * * * *